E. S. HOWARD.
HYDRAULIC FISHWAY.
APPLICATION FILED JUNE 25, 1920.
1,380,384.
Patented June 7, 1921.
3 SHEETS—SHEET 1.
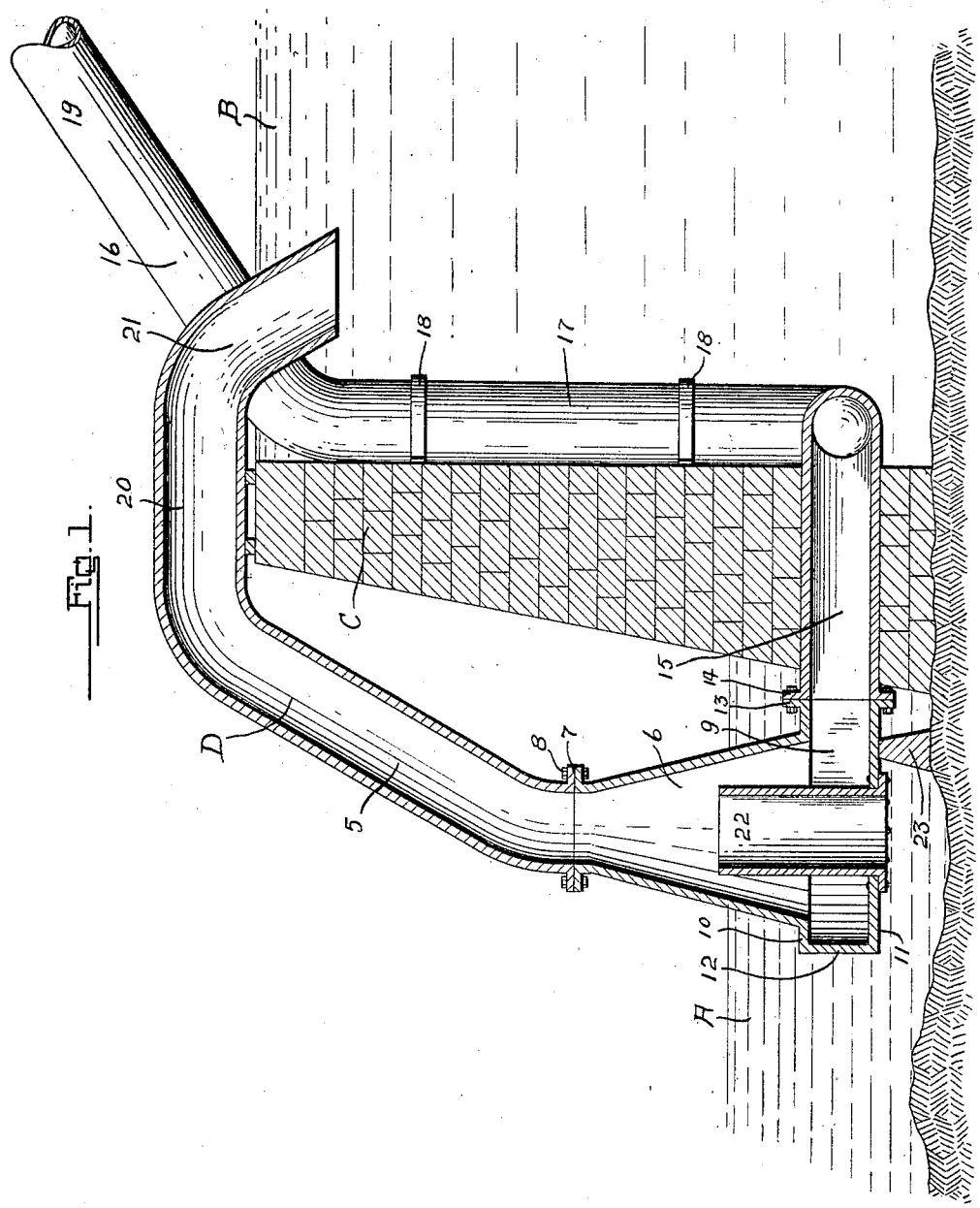
Inventor
Edward S. Howard.

E. S. HOWARD.
HYDRAULIC FISHWAY.
APPLICATION FILED JUNE 25, 1920.
1,380,384.
Patented June 7, 1921.
3 SHEETS—SHEET 2.
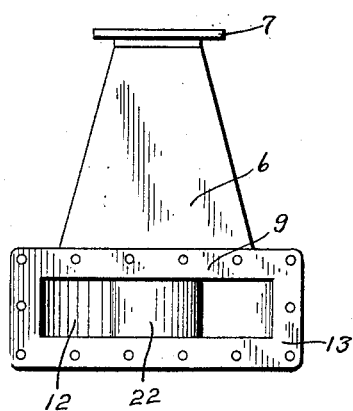
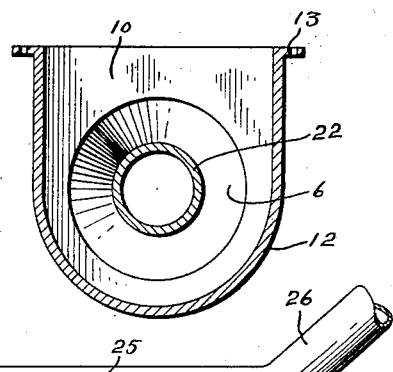
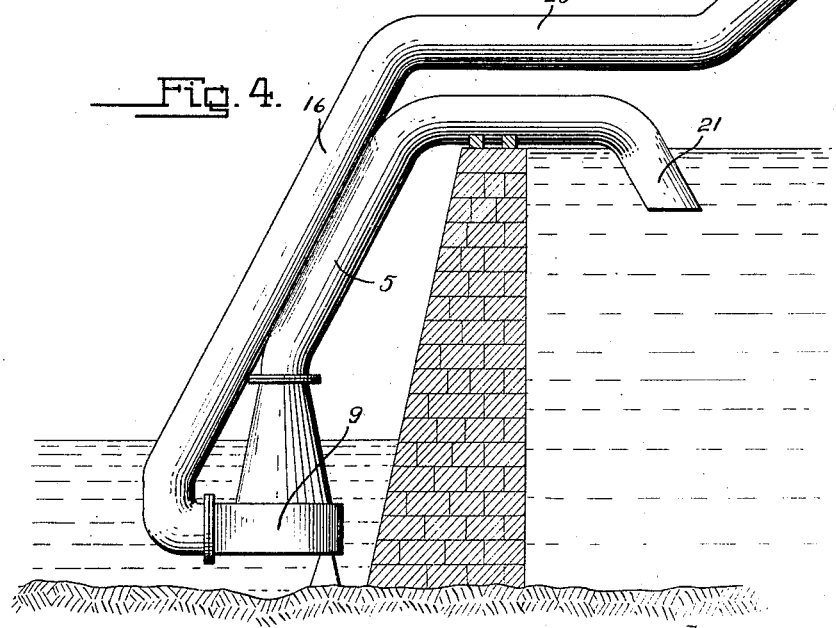
Inventor
Edward S. Howard.

E. S. HOWARD.
HYDRAULIC FISHWAY.
APPLICATION FILED JUNE 25, 1920.
1,380,384.
Patented June 7, 1921.
3 SHEETS—SHEET 3.
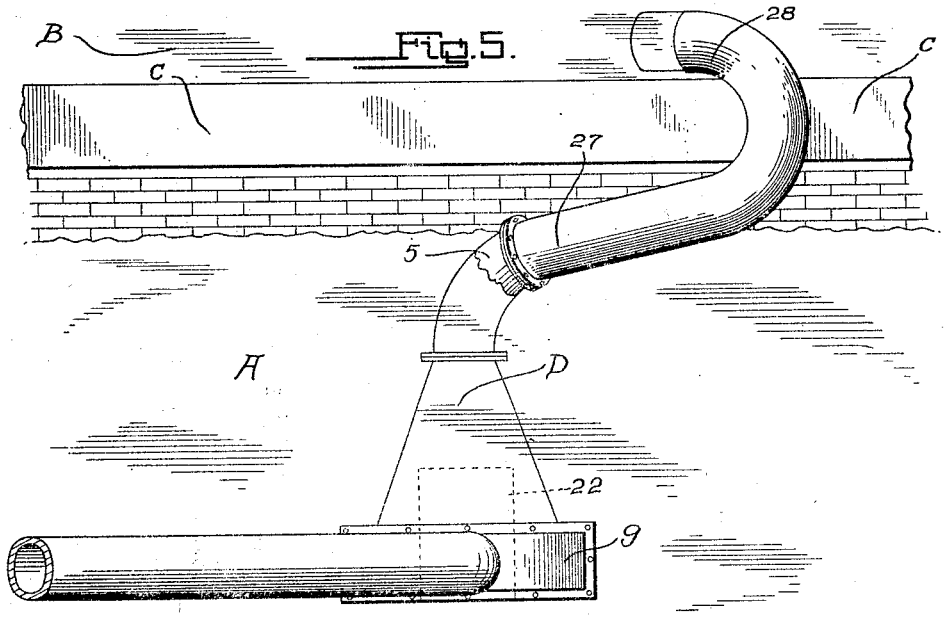
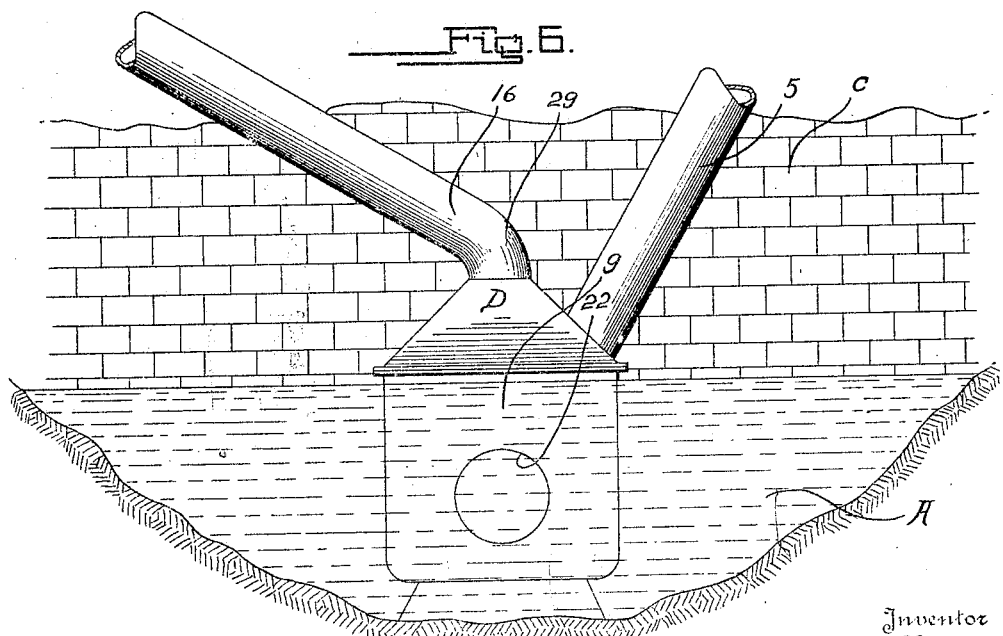
Inventor
Edward S. Howard
By Lancaster and Allwine
Attorneys

UNITED STATES PATENT OFFICE.

EDWARD SCOTT HOWARD, OF YREKA, CALIFORNIA.

HYDRAULIC FISHWAY.

1,380,384.  Specification of Letters Patent.  Patented June 7, 1921.

Application filed June 25, 1920. Serial No. 391,651.

*To all whom it may concern:*

Be it known that I, EDWARD S. HOWARD, a citizen of the United States, residing at Yreka, in the county of Siskiyou and State of California, have invented certain new and useful Improvements in Hydraulic Fishways, of which the following is a specification.

This invention relates to fish ways, and the primary object of the invention is to provide an improved means for permitting fish to pass upstream and by obstructions such as dams and the like during the running season.

Another object of this invention is to provide an improved fish way embodying a lead pipe or conveyer for the fish extending into the stream and over the obstruction, a means for forcing water up the conveyer, and means for associating the water forcing means with the conveyer so that a suction will be formed in the lower end of the conveyer for drawing the fish into the same.

A further object of the invention is to provide a novel fish way which can be quickly and easily associated with a dam or the like and which will not have any ill effects on the fish in any way whatsoever.

A still further object of the invention is to provide an improved fish way of the above character which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which drawings:

Figure 1 is a vertical section through a dam showing the improved fish way attached thereto, the fish way being also shown in section.

Fig. 2 is a detail rear elevation of the suction nozzle.

Fig. 3 is a horizontal section through the same.

Fig. 4 is a side elevation of a slightly modified form of the improved fish way, showing the same attached to a dam.

Fig. 5 is a plan view illustrating another method of arranging the fish way in a stream, and Fig. 6 is a front elevation of the same.

Referring to the drawings in detail, wherein similar reference characters designate corresponding parts throughout the several views, the letter A indicates a stream; the letter B the reservoir or lake formed by the dam C; and D the improved fish way for the dam uniting the stream with the reservoir or lake.

In Fig. 1 is shown a form of the invention, which can be embodied directly with the dam, and in this form the improved fish way includes the downwardly and forwardly inclined lead pipe or conveyer 5 for the fish and a flared substantially frusto-conical intake member 6. The meeting portions of the inclined conveyer or pipe 5 and the frusto conical shaped member 6 are provided with abutting outwardly extending annular flanges 7 which are connected together in any preferred manner such as by bolts or the like 8. The lower end of the frusto-conical shaped member 6 is connected to and communicates with a lower casing 9 which forms the intake for the water under pressure. The casing 9 includes the upper wall 10, the lower wall 11 and the substantially semi-circular side wall 12. The inner open side of the casing 9 is provided with upwardly extending flanges 13, which abut against the flanges 14 formed on the inner end of the horizontally disposed portion 15 of the pressure or water conveying pipe 16. The pressure or water conveying pipe 16 is provided with a downwardly disposed portion 17, which is connected to the dam by suitable clamps or the like 18. The extreme upper end of the vertically disposed portion 17 of the water conveying or pressure pipe 16 is provided with an inclined upwardly extending extension 19, which is extended to any suitable source of water supply whose level is above that of the lake or reservoir B. The upper end of the inclined conveyer or lead pipe 5 is provided with a horizontal extension 20 which is positioned over the upper face of the dam C. The horizontally disposed portion 20 is provided with a downwardly and inwardly inclined portion 21 which is adapted to extend into the lake or water reservoir. The lower wall 11 of the casing 9 is provided with an inlet nozzle 22 which extends in axial alinement with the frusto conical member 6. This nozzle 22 as shown communicates with the stream A and thus it can be seen that the fish are permitted to enter into the conveyer or lead pipe 5.

In operation of the improved device when water is permitted to flow down the inclined conveyer or water pipe 16 from a considerable height it will be seen that the same will rush into the frusto conical shaped member at a considerable speed, and will flow up the inclined pipe 5 and into the water reservoir or lake B. As the water under pressure rides past the nozzle 22, a suction is created therein, which will tend to draw the fish into the conveyer or lead pipe 5. As the fish are drawn in through the nozzle 22 by the suction caused by the incoming water, the same will be forced through the conveyer 5 and into the lake or reservoir.

Thus it can be seen that an effective and simple means is provided for permitting fish to pass obstructions in a river and stream during their running season. A suitable support 23 may be provided, so as to hold the casing 11 in spaced relation to the floor of the stream so as to permit the free uninterrupted entrance of the fish into the nozzle.

In Fig. 4 is shown a slightly modified form of the invention, which is adapted to be used in connection with dams already built so that no change will have to be made thereto. This form of the invention is practically the same as the form shown in Fig. 1, with the exception that the entrance of the casing 9 is turned outward and the water or pressure pipe 16 is disposed in parallel relation with the conveyer or lead pipe 5. In this instance, the water conveyer or pressure pipe 16 is provided with a horizontally disposed extension 25, which extends over the dam. The outer end of this extension is provided with the inclined conducting pipe 26 which leads to any suitable source of water supply.

In Figs. 5 and 6 is illustrated another method of placing the fishway in relation to the dam and stream and in this method the casing 9 is arranged in a substantially vertical position, with the suction pipe 22 submerged in the stream below the dam and lying horizontally or substantially so with the stream.

The fish conveyer or discharge pipe 5 extends at an angle as at 27 from the casing 9 in this instance and is coiled over the dam C as at 28. The pressure or water conveying pipe 16 extends outwardly from the casing 9 as at 29 in a direction opposite to the conveyer or discharge pipe 5 and the pressure pipe is adapted to be connected with a body of water whose level is higher than the lake formed by the dam.

Changes in details may be made without departing from the spirit or scope of this invention; but,

I claim:

1. A fish way comprising a fish conveyer pipe having communication with the stream and a body of water formed by an obstruction in the stream, means for directing a column of water up through the conveyer pipe under pressure.

2. A fish way comprising a fish conveyer pipe having communication with the stream and a body of water formed by an obstruction in the stream, means for directing a column of water through the conveyer pipe under pressure, said means communicating with the lower end of the fish conveyer pipe, whereby a suction will be created at the entrance end of said fish conveyer pipe.

3. In a fish way comprising a fish conveyer pipe having communication with the stream and a body of water formed by an obstruction in the stream, a water conveying pipe connecting the lower end of the fish conveying pipe with a body of water having a higher level than the body of water formed by the obstruction, and an inlet suction nozzle communicating with a stream and extending into the fish conveyer pipe and terminating at a point above the connection of the water pipe therewith.

4. In a fish way comprising a fish conveyer pipe having communication with the stream and a body of water formed by an obstruction in the stream, a substantially frusto-conical member communicating with the lower end of said fish conveyer pipe, a casing communicating with the lower end of said frusto-conical member, a water conveying pipe connecting the casing with a body of water having a higher level than the body of water formed by the obstruction, and a suction nozzle carried by the casing and communicating with the stream and terminating at a point above the casing into the frusto conical member.

5. The combination with a dam, of a fish way including an inclined fish conveyer pipe, a horizontal extension arranged over the dam and extending into the body of water formed by the dam, a substantially frusto-conical member communicating with the lower end of the inclined fish conveyer pipe extended into the stream below the dam, a casing communicating with the lower end of the frusto conical member, a pressure pipe connecting the casing with a stream having a higher level than the body of the water formed by the obstruction, an inlet nozzle carried by the central portion of the casing and communicating with the stream of water below the dam and extending into the frusto-conical member.

6. The combination with a dam, of a fish way therefor including an inclined fish conveyer pipe, a horizontal extension arranged over the dam, an inclined outlet pipe formed on said horizontal extension and communicating with the body of water formed by the dam, a frusto conical member communicating with the lower end of the inclined fish conveyer pipe and extending into the stream below the dam, a casing communicating with the lower end of the frusto conical member submerged in said stream below the dam, a pressure pipe extending through the dam and communicating with the casing and a body of water having a higher level than the body of water formed by the dam, and an inlet nozzle carried by the casing and communicating with the stream below the dam and extending into the frusto-conical member and terminating short of the upper end thereof.

7. A fishway comprising a fish conveyer member having communication with a stream and a body of water formed by an obstruction in the stream, and means for creating a suction in the mouth of the conveyer member for drawing the fish therein.

8. A fishway comprising a fish conveyer member for communication with a stream and a body of water formed by an obstruction in the stream, including an inclined pipe extending above the obstruction, a downwardly curved outlet pipe carried by the upper end of the inclined pipe and extending toward the body of water, and an inlet nozzle carried by the lower end of the inclined pipe and arranged in the stream.

9. A fishway comprising a fish conveyer member for connecting a relatively low body of water with a relatively high body of water including an inclined pipe, a downwardly bent outlet pipe carried by the upper end of the inclined pipe and extending toward the relatively high body of water, and an enlarged flared conical inlet nozzle carried by the lower end of the inclined pipe and arranged in the relatively low body of water.

10. A fishway comprising a fish conveyer pipe having communication with a stream and a body of water formed by an obstruction in the stream, the pipe having a free unobstructed passage way therethrough, and means for directing a column of water through the conveyer pipe.

EDWARD SCOTT HOWARD.